Figure 1:
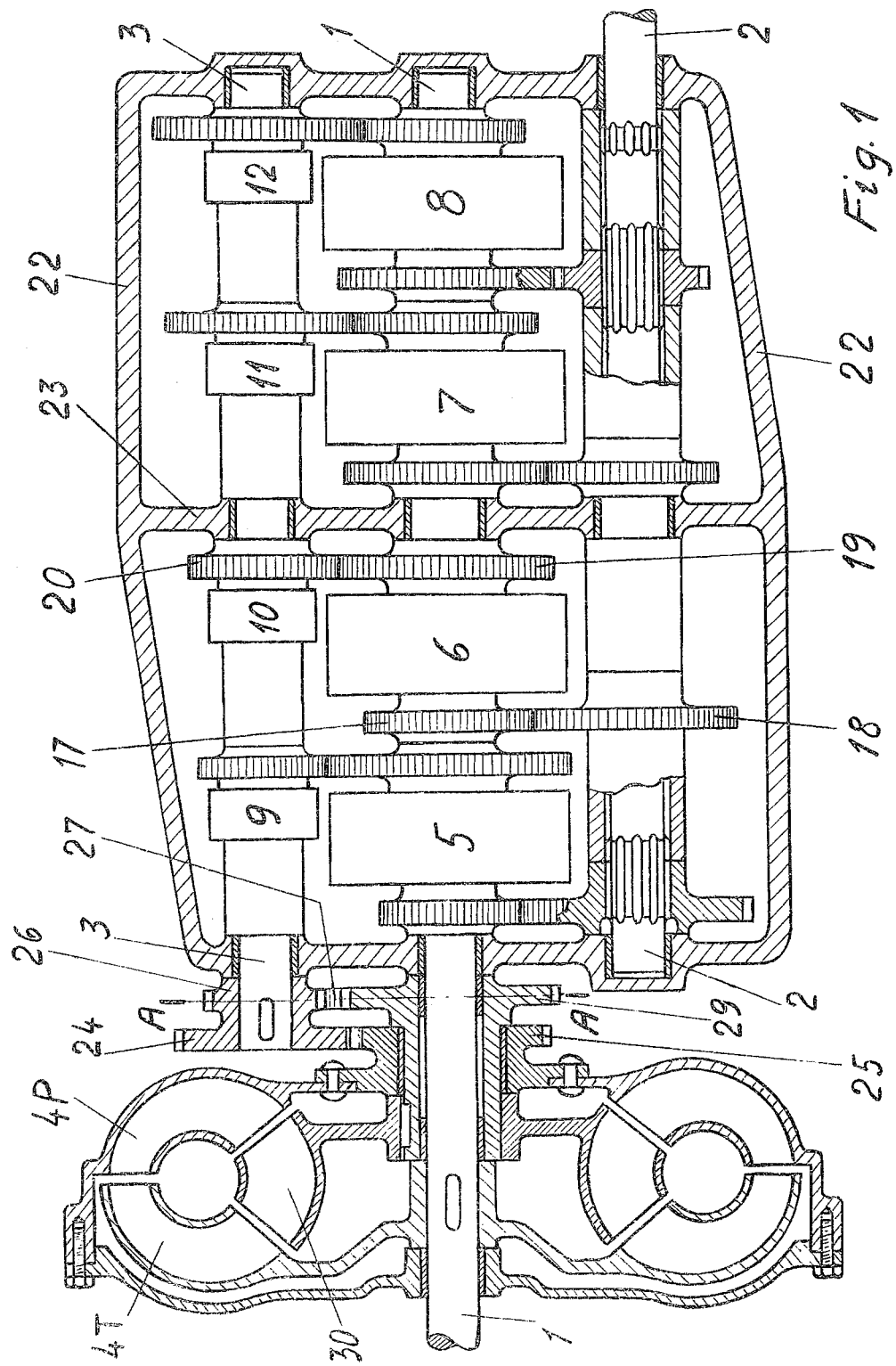

United States Patent [19]

Reenskoug

[11] 3,890,855

[45] June 24, 1975

[54] FULLY AUTOMATIC TORQUE RESPONSIVE PLANETARY GEARBOX WITH PLURAL COUNTERSHAFTS

[76] Inventor: Hans Ivar Reenskoug, 63 Skogsgatan, Linkoping, Sweden

[22] Filed: May 20, 1974

[21] Appl. No.: 471,534

[30] Foreign Application Priority Data

May 23, 1973 Sweden .............................. 7307241

[52] U.S. Cl. ...................... 74/730; 74/677; 74/688; 74/731
[51] Int. Cl. ....................... F16h 47/00; F16h 47/08
[58] Field of Search ............. 74/677, 687, 688, 730, 74/731

[56] References Cited
UNITED STATES PATENTS

| | | | |
|---|---|---|---|
| 2,149,369 | 3/1939 | Sinclair ............................. | 74/731 X |
| 2,972,905 | 2/1961 | Bullard ............................. | 74/687 X |
| 3,050,164 | 8/1962 | Bowen et al. ..................... | 74/730 X |
| 3,452,621 | 7/1969 | Golan et al. ..................... | 74/688 X |
| 3,503,281 | 3/1970 | Gsching et al. .................. | 74/687 X |

Primary Examiner—Samuel Scott
Assistant Examiner—Lance W. Chandler
Attorney, Agent, or Firm—Elliott I. Pollock

[57] ABSTRACT

A fully automatic gear box includes a primary shaft which is arranged to cooperate with one of the rotary elements of a torque converter, and with one of the three rotary members in each of a plurality of planetary gearings which are provided, one for each gear step, in the gear box. Another of the rotary members of each planetary gearing is arranged to cooperate, directly or via a free wheel coupling, with the output shaft of the gear box; and the third one of the rotary members of each planetary gearing is arranged to cooperate, directly or via a free wheel coupling, with a return shaft in the gear box. The return shaft in turn cooperates with another rotary element of the torque converter. The transmission of motion and the gear change are selected to cause the impeller and turbine elements of the torque converter to rotate in the same direction, with the impeller being rotated at a higher speed than the turbine under all operating conditions.

3 Claims, 3 Drawing Figures

FULLY AUTOMATIC TORQUE RESPONSIVE PLANETARY GEARBOX WITH PLURAL COUNTERSHAFTS

The present invention relates to a variable, fully automatic gear change device, preferably intended for motor vehicles, but also useful in other fields, where it is desired to vary the number of revolutions and torque of an output shaft automatically as a function of the load thereon.

The device of the invention is of a type comprising a torque converter known per se, preferably of hydrodynamical type, which cooperates with two or more mechanical gear steps consisting of e.g. planetary gearings operating as differentials.

Some known constructions are designed in such a way that the whole power from the motor is supplied to the hydrodynamical torque converter via a drive shaft, which in turn transfers its output to a gearbox with two or more steps, where the gear ratio (the gear) is brought into engagement by a complicated automatic system sensitive to adjustment and guiding the gear ratio of the output shaft.

Gearboxes of this type have so far been of a complicated construction, because they have been built around one single central shaft and been equipped with advanced automatic control means. This basic construction has had a restrictive influence on the possibilities of development, and therefore they have only two or three gears even in the cases when a fourth or fifth gear should be desirable.

In another type of automatic gearbox the torque converter is adapted to drive the output shaft parallelly to the power transmission via a mechanical gearing of planetary type, a so-called split torque, where the selection of gear like at the previous type is guided by a complicated hydraulic system, which in turn receives impulses from recording means, such as the throttle pedal or the centrifugal regulator on the output shaft. This type of gearbox is also built around a central shaft and has complicated automatic control means and a rapidly increasing degree of complication with the addition of more steps of gear changing.

However, correctly designed the two aforesaid types of gearboxes will function satisfactorily, but they have one disadvantage in common, which may sometimes (e.g. when the roads are slippery) be a real inconvenience. At the moment of engaging a gear replacing another gear a more or less obvious jerk will arise, which as a rule will be more violent the more the throttle is opened. This is inevitable considering that rotating masses are to be accelerated or retarded at the moment of gear changing under the influence of multiple-plate or strap brakes.

Gear change devices are known, which operate quite without steps and without jerks, but these are of friction type or work with V-belt transmission. They function well for low motor powers but are not suitable for great powers and heavy vehicles.

The present invention relates to a fully automatic gearbox with a number of mechanical steps of gear changing, where the gearing change between the different steps takes place quite smoothly, and whose construction is so simple that a great number of gears can be arranged in series, without the difficulties being multiplied. In spite of the apparent lack of steps in the gearbox of the invention, it operates with planetary gear reduction sets of a known and tested type, which makes it possible to use great motor powers and utilize them to a full extent.

The apparent lack of steps of the gearbox according to the invention is realized by the fact that no rotating means are accelerated or retarded either in the gearbox or the motor at the moment of gearing and by the fact that the real time for change of gear is nil, and that the driving torque of the motor does not cease for one single moment either at changing down or changing up. This will for instance give a car driver the impression of a stepless gearing.

The gearbox of the invention is substantially characterized in that the primary shaft of the gearbox is arranged to cooperate with one of the rotary elements (the turbine part) included in the torque converter and with one of the three rotary main means (two sun pinions and one planet wheel holder) in a number of planetary gearings arranged after each other, one for each gear step, another of the rotary main means of each of the planetary gearings being arranged to cooperate directly or via a free wheel coupling with the output shaft of the gearbox and the third of the rotary main means of each of the planetary gearings being arranged to cooperate directly or via a free wheel coupling with a return shaft, which is adapted to cooperate with another rotary element (the impeller) included in the torque converter. The transmission of motion and the gear change are selected so that the impeller and the turbine rotate in the same direction, and the impeller obtains a higher number of revolutions than the turbine under all operating conditions.

In order to improve the efficiency of the hydrodynamical torque converter it may be suitable to have the return shaft control the speed of the stator of the converter in the course of a suitable gear change so that the best possible cooperation between the impeller and turbine wheels is obtained at different degrees of slip of the turbine wheel relative to the pump wheel.

In view of the resistance it may be suitable that all free wheel couplings are arranged on the return shaft as the stresses on this shaft will be less than on the output shaft, and consequently also less on the free wheels.

One embodiment of the invention which has appeared to be especially suitable from a constructive point of view is substantially characterized in that all the planetary gearings are made reciprocally identical and that the three rotary main means consist of a big sun pinion and a small one, which cooperate with planet wheels disposed in a holder — which forms the third main means — the big sun pinion in all planetary gearings being rigidly connected to the primary shaft of the gearbox and following this in its rotation and the small sun pinion in all planetary gearings being in permanent tooth connection with a gear on the output shaft, the holders of the planet wheels in all planetary gearings being in permanent tooth connection with each of their corresponding gears on the return shaft, a free wheel coupling being arranged between each such gear and the return shaft so that the gear drives the shaft as soon as its rotary speed tries to exceed that of the shaft.

It is in the nature of the problem that equivalent solutions arise if the small sun pinions are made to work on the return shaft and the holder of the planet wheel on the output shaft. Of course the free wheel couplings can be arranged on the output shaft even if, as mentioned above, the stresses on the very free wheel couplings will then increase. From consideration of space — or for other reasons — it may in certain cases be suitable to arrange a four-speed gearbox, for example, with two of the free wheel couplings on the return shaft and two on the output shaft.

The gear ratio in each gearing position is decided by the ratio between the gear on the output shaft and the corresponding drive wheel of the planetary gearing.

The selection of the gear ratio between the gear on the return shaft and the corresponding wheel of the planetary gearing determines which of the planetary gearings will be in engagement at a certain moment, i.e. to act on the output shaft.

By a suitable selection of the gear ratio between the return shaft and the planetary gearings the effect is obtained according to the invention that the slip of the torque converter selects automatically the gear suitable for the moment in cooperation with the free wheels without any other automatic control devices being required.

It is necessary to calculate the aforesaid gear ratio starting from the technical data of the torque converter — or vice versa — so that the slip is within the range of the torque converter in all gears, where the efficiency is around 80 percent or more. A plurality of known torque converters have a very flat curve of efficiency even at a relatively great slip, and it is essential that all steps of gear changing are within this range.

The function will be described below more in detail in connection with the appended drawings, showing an especially suitable, compact and simple embodiment of a gearbox according to the invention. In order to get a better survey certain schematic representations have been employed. Thus most of the loaded bearings are shown as slide bearings, where of course ball bearings, roller or needle bearings will be used in practice.

Figure 2:
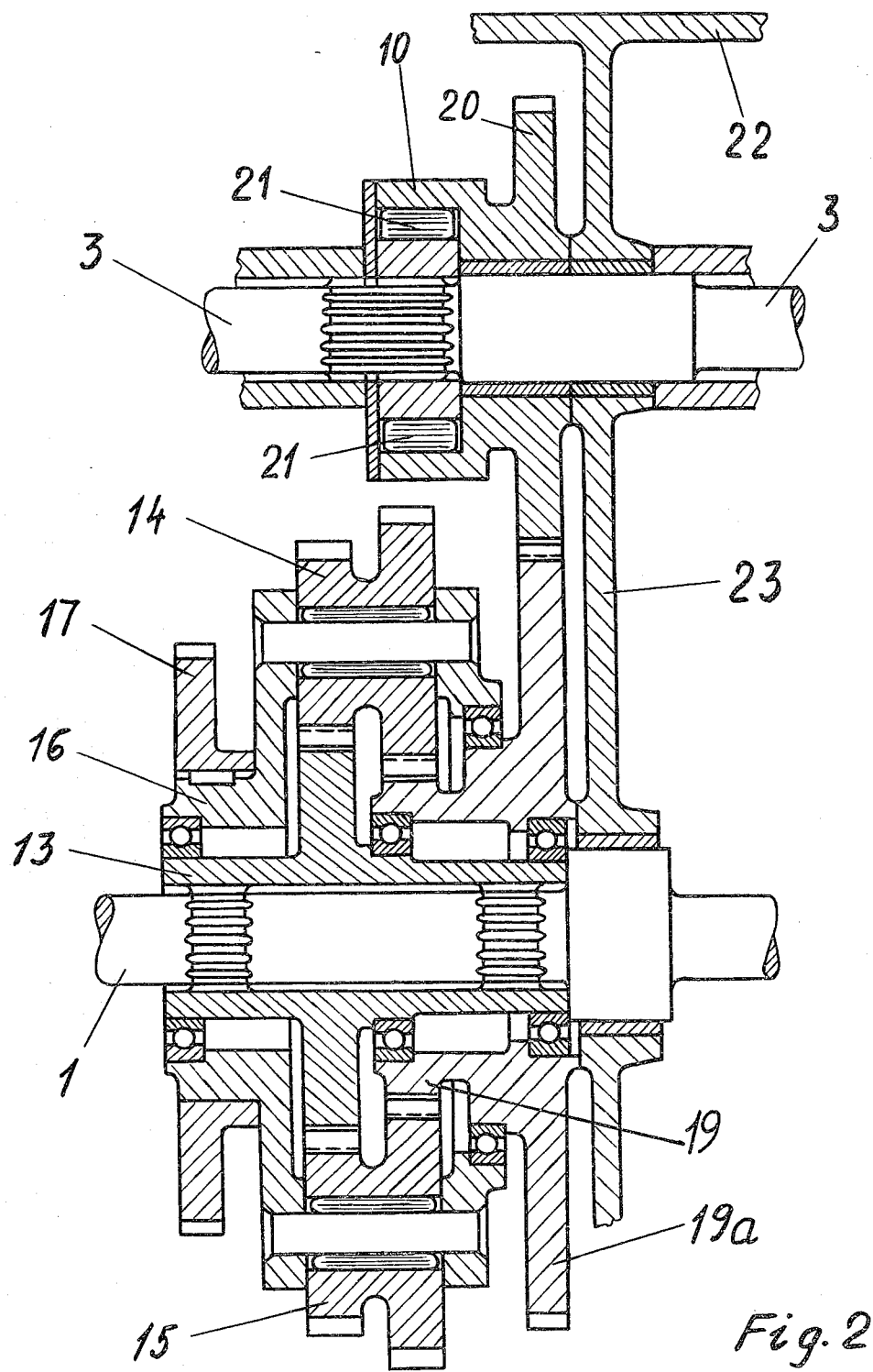
Figure 3:
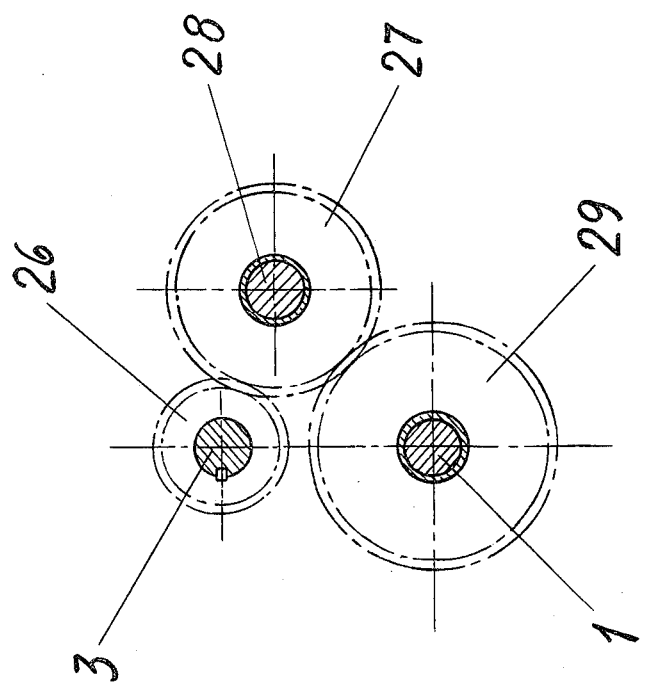

On the drawing FIG. 1 shows a longitudinal section of a gearbox with a torque converter according to the invention. FIG. 2 shows a section of one of the reciprocally similar planetary gearings with free wheel coupling to the return shaft of the gearbox included in the gear box in FIG. 1. FIG. 3 shows schematically how three gears are arranged in the section A—A in FIG. 1.

The embodiment of the invention illustrated on the drawings is built on three shafts, a primary shaft 1, an output shaft 2 and a return shaft 3, and it is possible to say that the whole gearbox operates as a differential at every moment, i.e. the power of the primary shaft 1 is distributed between the output shaft 2 and the return shaft 3 in the same way as the differential between the drive wheels of a car distributes the power of the drive shaft between the drive wheels.

The return shaft 3 operates via a gear directly on the driving portion (the impeller 4 P) in the hydrodynamical torque converter, and the latter's driven portion (the turbine 4 T) is arranged on the primary shaft 1 and follows it in its rotation. The number of gear changes are selected so that the pump portion 4 always has a higher number of revolutions than the turbine portion 4 T.

The hydrodynamical torque converter will in this way always exert a braking moment on the return shaft 3, and the size of the moment will be dependent on the degree of slip between the pump portion 4 P and the turbine portion 4 T. This braking moment on the return shaft 3 is a condition for creating a torque on the output shaft 2 due to the differential effect of the planetary gearings.

As the torque converter always tries to adjust itself so that the speed difference between the pump wheel and the turbine wheel will be as small as permitted by the load, it will automatically engage the highest possible gear by the degree of slip. The less the slip is, the higher the gear.

The above-mentioned braking moment on the return shaft 3 can thus be said to arise by the pump portion 4 P driven by the return shaft 3 driving the turbine portion 4 T connected to the primary shaft 1, to which that power is supplied in this way, which has been diverted in the planetary gearing working at the moment. This restoring makes it possible to achieve a very good total efficiency of the gear change device.

In the embodiment shown the gearbox has four gears, and they have as correspondence four identical planetary gearings 5–8 and four identical free wheel devices 9–12 cooperating with these. FIG. 1 shows all the planetary gearings arranged on the primary shaft 1, which is apparently a constructive suitable measure in most possible cases. All the free wheels are shown on the return shaft 3 for the sake of clearness. As mentioned above it can be advantageous to place two of the free wheels on the output shaft 2 and two on the return shaft 3. Of course the function will be the same.

The construction of the planetary gearing 6 is apparent from FIG. 2 and the free wheel 10 from FIG. 1. The primary shaft 1 is rigidly connected with a gear 13, forming the big sun pinion in the planetary gearing 6 in FIG. 1. This sun pinion 13 is in permanent engagement with two planet wheels 14 and 15 mounted in a planet wheel holder 16. The latter is provided with or rigidly connected with a gear 17, which is in permanent tooth engagement of teeth with a gear 18 on the output shaft 2 (see FIG. 1).

The planet wheels 14 and 15 have in known manner two toothed paths, one in engagement with the sun pinion 13 which is rigidly connected to the primary shaft 1, and the other in engagement with the other sun pinion 19 of the planetary gearing, which is rotatably mounted on the hub of the sun pinion 13. The hub of the sun pinion 19 is built with a gear 19a which is in permanent engagement with a gear 20 (see also FIG. 1), whose hub is designed around the return shaft 3 as a free wheel device (10 in FIG. 1), which in known manner will have the effect by means of rolls 21 and oblique grooves (not shown) that if the shaft 3 rotates more quickly than the gear 20 it will be "free" of the wheel, but if the gear 20 "reaches" the speed of the shaft 3, the free wheel will lock the shaft with the gear, which means that the gear 20 will take over the drive of the shaft.

In the embodiment shown the planet wheel holder 16 (and the gear 17 connected with this) is mounted on the hub of the sun pinion 13, and on the hub of the sun pinion 19 in order to make the gearbox as short as possible axially. A stabilizing intermediate wall in the gearbox case 22 is designated by 23.

As already mentioned the free wheel devices 9–12 are identical, but the gears (20 at the free wheel 10) cooperating with them are of different size. Thus the gear 20 and its corresponding gears in the other free wheels 9, 11 and 12 operate in such a way that the gear, to which the highest speed is imparted by its planetary gearing, drives the return shaft 3.

This shaft 3 drives the pump portion via a gear 24 rigidly attached to it and a gear 25 connected to the pump portion 4 P of the hydraulic torque converter.

However, what is essential for the inventive idea and for the intended function is that the return shaft 3 will always try to impart a higher speed to the pump portion 4 P in the hydrodynamical torque converter than that imparted to the turbine portion 4 T by the primary shaft 1.

In order to improve the working conditions of the hydraulical torque converter (i.e. the total efficiency) it may be appropriate to arrange another gear 26 on the return shaft 3, which gear, as shown in FIG. 3, is in toothed engagement with a gear 29 via an intermediate wheel 27 (mounted on a shaft 28, which is stationary relative to the gearbox case 22), said gear 29 being rigidly connected to the blade portion 30 of the hydraulic torque converter, said blade portion being rotatably mounted around the primary shaft 1 (see FIG. 1). The blade portion 30 is then moved in a direction of rotation opposite to that of the pump and turbine portions respectively.

The gearbox described above operates in the following way.

At start of the motor with the output shaft 2 braked the primary shaft 1 starts to rotate at a low speed and consequently also the turbine wheel 4 T, which is thus stationary on the shaft 1. This means that the free wheel 9 belonging to the starting gear will in this position rotate most rapidly as a consequence of the gear changes selected and the power derived from the planetary gearing 5 thus in operation will be returned to the return shaft 3 and the torque converter to the primary shaft 1.

When the brake is released and the output shaft 2 starts to rotate, the planetary gearing 5 will reduce the speed of the free wheel 9 and consequently also that of the return shaft 3 by the planetary gearing functioning as a differential.

The other free wheels will also reduce their corresponding speeds, although at a slower rate, the higher gears reducing this speed more slowly than the lower ones, which is in its turn a consequence of the different gear changes.

This means that as the speed of the output shaft 2 increases, the speed of the free wheel 9 will decrease more rapidly than the speed of the free wheel 10, which results in that the free wheel 10 will so to say "reach" the free wheel 9 and take over quite imperceptibly the drive of the return shaft 3 now having a lower speed than before.

At the moment the free wheel 10 takes over the drive of the return shaft 3 the second speed gear will be connected, and when the speed of the output shaft increases with increasing speed of the vehicle, the third speed gear will be connected in the same way as well as the next speed gear etc, until the highest speed gear has been brought into engagement via its free wheel.

When the highest speed gear has been connected the return shaft will thus rotate at its lowest speed.

If the output shaft 2 meets with a greater resistance (torque) e.g. due to an ascent, it will reduce its speed, the speed of the return shaft increasing so that the next lower free wheel will take over the drive and the next lower gear is connected.

If the moment on the output shaft is again reduced, the course will be turned, i.e. the gear box will gear up.

The torque converter will then function with the degree of slip acting as guiding means for the selection of the gearbox gear. The greater the slip is, the lower the gear.

As mentioned above it will always try to adjust itself so that the speed difference between the pump wheel and the turbine wheel will be as small as permitted by the load. This has the effect that the gearbox of the invention will always operate with the highest gear that is possible under the existing load conditions. This is automatically achieved without it being necessary to arrange any extra guiding means or any special control devices.

What is claimed is:

1. A fully automatic gearbox comprising a torque converter having a rotary pump element and a rotary turbine element, said gearbox including a primary shaft, an output shaft, and a return shaft, said shafts cooperating with said torque converter and with a plurality of planetary gearings to provide at least two mechanical steps of gear changing each of which includes a planetary gearing having three rotary members, the primary shaft of the gearbox being coupled to one of the rotary elements of the torque converter and to a first one of the three rotary members in each of said plurality of planetary gearings, said planetary gearings being arranged one after the other, one for each step of gear changing, a plurality of free wheel couplings, one for each gear changing step, a second one of the rotary members of each of the planetary gearings being arranged to cooperate, directly or via the free wheel coupling of the associated gear changing step, either with the output shaft of the gearbox or with the return shaft, said return shaft being coupled to another rotary element in the torque converter, transmission of motion and gear change being operative to cause the pump element and the turbine element of the torque converter to rotate in the same direction with the pump element having in all operating conditions a higher speed than the turbine element, the third rotary member of each of the planetary gearings being arranged to cooperate directly or via the free wheel coupling of the associated step of gear changing either with the return shaft or with the output shaft of the gear box.

2. The automatic gearbox according to claim 1 wherein a gear is rigidly connected to the return shaft in order to control the speed of a blade rim in said torque converter to obtain the best possible cooperation between the pump and turbine elements at different degrees of slip of the turbine element relative to the pump element, said gear being in engagement via an intermediate wheel with a further gear which is rigidly connected to the blade rim in the torque converter.

3. The automatic gearbox of claim 1 wherein all the planetary gearings are made reciprocally alike, the three rotary members in each planetary gearing comprising a big sun pinion and a small sun pinion which cooperate with planet wheels in a holder, the big sun pinion in all the planetary gearings being rigidly connected to the primary shaft of the gearbox for rotation therewith.

* * * * *